United States Patent [19]

Mukohjima

[11] Patent Number: 5,311,093
[45] Date of Patent: May 10, 1994

[54] DRIVING CIRCUIT FOR VIBRATION DRIVEN MOTOR

[75] Inventor: Hitoshi Mukohjima, Fukuoka, Japan

[73] Assignee: Canon Kabushiki Kaisha, Tokyo, Japan

[21] Appl. No.: 845,953

[22] Filed: Mar. 4, 1992

[30] Foreign Application Priority Data

Mar. 6, 1991 [JP] Japan .................. 3-040114

[51] Int. Cl.⁵ .......................................... H01L 41/08
[52] U.S. Cl. .................................... 310/317; 310/319
[58] Field of Search .................. 310/317, 323, 319

[56] References Cited

U.S. PATENT DOCUMENTS

| | | | |
|---|---|---|---|
| 3,363,117 | 1/1968 | Mondot et al. | 310/317 |
| 4,181,864 | 1/1980 | Etzold | 310/317 |
| 4,228,440 | 10/1980 | Horike et al. | 310/317 |
| 4,498,089 | 2/1985 | Scardovi | 310/317 |
| 4,524,295 | 6/1985 | Allensworth et al. | 310/328 |
| 4,632,311 | 12/1986 | Nakane et al. | 310/316 |
| 4,833,358 | 5/1989 | Suzuki et al. | 310/317 |
| 5,087,850 | 2/1992 | Suzuta | 310/317 |

FOREIGN PATENT DOCUMENTS

| | | |
|---|---|---|
| 63-154076 | 6/1988 | Japan . |
| 1315273 | 12/1989 | Japan . |
| 2179282 | 7/1990 | Japan . |
| 0426042 | 5/1991 | Japan . |
| 0694520 | 7/1953 | United Kingdom ............ 310/317 |

Primary Examiner—Steven L. Stephan
Assistant Examiner—C. LaBalle
Attorney, Agent, or Firm—Fitzpatrick, Cella, Harper & Scinto

[57] ABSTRACT

A predetermined inductance element L is connected serially or in parallel with a selfelectrostatic capacitance $C_d$ of a vibrator of a vibration driven motor, a serial resonance or a parallel resonance of the above LC circuit is used, and thereby provides an optimum driving circuit for the vibration driven motor.

7 Claims, 5 Drawing Sheets

DRIVING CIRCUIT FOR VIBRATION DRIVEN MOTOR

BACKGROUND OF THE INVENTION

1. Field of the Invention

The invention relates to a vibration driven motor and, more particularly, to a driving circuit for a vibration driven motor.

2. Related Background Art

In recent years, a vibration driven motor called an ultrasonic motor or a piezo-electric motor has been developed and has been put into practical use by the same applicant as the present invention or the like. As already well-known, the vibration driven motor is a new type motor of the non-electromagnetic driving type which is constructed in a manner such that by applying an alternating voltage to an electro-mechanical energy conversion element such as piezo-electric element, electro-strictive element, or the like, a high frequency vibration is caused in the above element, and a vibration energy is taken out as a continuous mechanical motion. The vibration driven motor is mainly classified as a standing wave type motor or a travelling vibration type motor according to the kind of vibration which occurs in the piezo-electric element or electro-strictive element.

FIG. 5 schematically shows a driving circuit of a conventional vibration driven motor of the travelling vibration type. Reference numeral 1 denotes a vibrator comprising a coupling member of a piezo-electric element or an electro-strictive element and an elastic member; 1a, 1b, 1a', and 1b' indicate driving electrodes for applying an alternating voltage to the piezo-electric element or electro-strictive element; 2 indicates an oscillator to generate the alternating voltage; 3 indicates a phase shifter of 90°; and 4a and 4b indicates amplifiers.

As shown in the diagram, the above motor is a two-phase driven motor and there is no difference between the first and second phases except that the phase of alternating voltage which is applied to each phase is shifted by ±90° by the 90°-phase shifter 3. Therefore, only the one-phase portion shown by reference numeral 5 will now be described.

FIG. 6 shows an equivalent circuit of the first phase portion 5. Reference numeral 6 denotes an amplifying section; and 7 denotes an equivalent circuit of the vibration driven motor. The equivalent circuit 7 comprises: an RLC serial circuit (which is constructed by an equivalent resistor 7a of a resistance value $R_m$, an equivalent coil 7b of a self-inductance $L_m$, and an equivalent capacitor 7c of an electrostatic capacitance $C_m$) of the mechanical vibrating portion; and a capacitor 7d of a specific electrostatic capacitance $C_d$ of the vibrator 1 which is connected in parallel with the RLC serial circuit.

However, hitherto, assuming that the alternating voltage which is applied is set to $V_i$ and the voltage across the driving electrodes 1a and 1a' is set to $V_O$, it is generally necessary to apply a voltage within a range from tens of volts to hundreds of volts to the vibration driven motor. Therefore, a voltage step-up ratio $n = |V_O/V_i|$ exerts a large influence on the characteristics of the motor.

The vibration driven motor increases and controls an amplitude of vibration wave by using the mechanical resonance. For this purpose, an alternating voltage of a frequency near a mechanical resonant frequency $$f_m = 1/(2\pi \sqrt{L_m C_m})$$

is applied. However, the equivalent circuit constants $R_m$, $L_m$, and $C_m$ of the mechanical vibration of the vibration driven motor vary depending on an environmental temperature of the motor, a magnitude of amplitude, or the like. Therefore, in the frequency characteristics of the equivalent circuit shown in FIG. 6, an input electric power and an output power of the motor vary widely. A driving circuit suitable for the above frequency characteristics is needed.

SUMMARY OF THE INVENTION

It is an object of the invention to provide a driving circuit suitable for a vibration driven motor.

Another object of the invention is to provide a cheap and simple driving circuit in addition to the above object.

The above and other objects and features of the present invention will become apparent from the following detailed description and the appended claims with reference to the accompanying drawings.

According to one aspect of the invention, a predetermined inductance element L is connected serially or in parallel with a self-electrostatic capacitance $C_d$ of a vibrator of a vibration driven motor. An serial resonance or a parallel resonance of the above LC circuit is used, and thereby provides an optimum driving circuit for the vibration driven motor.

DETAILED DESCRIPTION OF THE PREFERRED EMBODIMENTS

Figure 1:
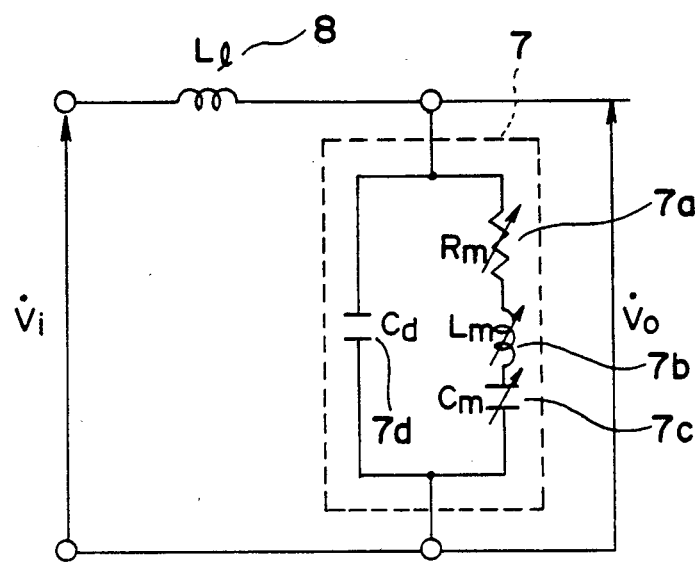
FIG. 1 is an equivalent circuit diagram showing a first embodiment of a vibration driven motor according to the invention.

FIG. 1 is an equivalent circuit diagram of the first embodiment of a driving circuit for a vibration driven motor according to the invention. Reference numeral 7 denotes the equivalent circuit of the vibration driven motor and 8 indicates an inductance element having an inductance $L_i$ connected serially to the equivalent circuit 7.

Since the other portions of the driving circuit for the vibration driven motor and the mechanical structure of the vibration driven motor are substantially the same as those of the well-known driving circuit and vibration driven motor, their descriptions are omitted here.

As already mentioned above, the components $R_m$, $L_m$, and $C_m$ of the RLC serial circuit section of the mechanical vibrating portion of the vibration driven motor in the above equivalent circuit are changed in accordance with the environmental temperature of the motor, magnitude of the amplitude, or the like.

Figure 7:
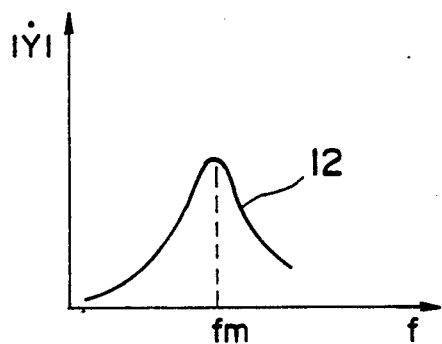
FIG. 7 is a characteristic graph showing characteristics of an RLC serial circuit shown in FIG. 6.

In FIG. 7, a solid line 12 shows frequency characteristics of an absolute value $|Y|$ of an admittance of the RLC serial circuit section shown in FIG. 1.

$$|Y| = \frac{1}{\sqrt{R_m^2 + \left(\omega L_m - \frac{1}{\omega C_m}\right)^2}} \quad (1)$$

where, ($\omega \leq 2\pi f$)

As will be understood from the equation (1), $|Y|$ has the maximum value at the mechanical resonant frequency $$f_m = 1/(2\pi \sqrt{L_m C_m})$$

Figure 8:
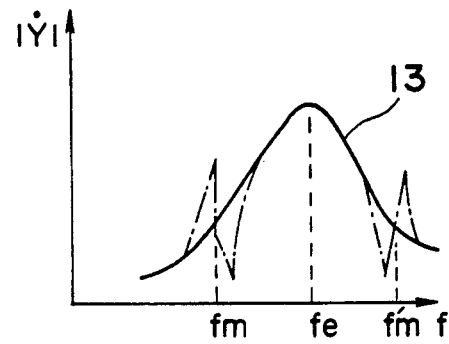
FIG. 8 is a characteristic graph showing characteristics of the first embodiment.

FIG. 8 shows frequency characteristics of the absolute value $|Y|$ of the admittance of the equivalent circuit of FIG. 1. A solid line 13 shows the frequency characteristics in the case where the RLC serial circuit of the mechanical vibrating portion is eliminated from the equivalent circuit of FIG. 1. In the above case, the serial resonance circuit comprising the inductance $L_l$ and electrostatic capacitance $C_d$ which are serially connected is used as an equivalent circuit. $|Y|$ has the maximum value at the electrical resonant frequency $$f_e = 1/(2\pi \sqrt{L_l C_d})$$

By adding the equivalent circuit (RLC serial circuit) of the mechanical vibrating portion of the above construction, characteristics as shown by an alternate long and short dash line are obtained. Labels $f_m$ and $f_m'$ indicate mechanical resonant frequencies. Characteristics in each of the cases where $f_m \leq f_e$ and $f_m' \geq f_e$ are shown.

Figure 12:
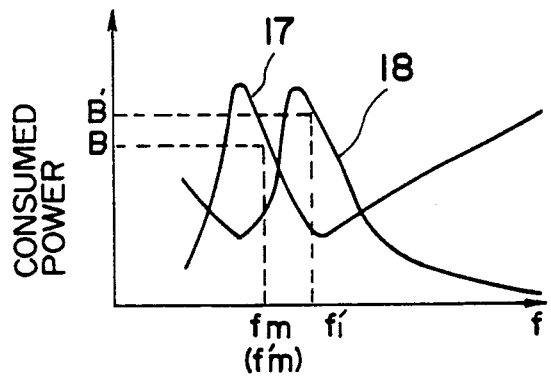
FIG. 12 is an explanatory diagram showing a consumed power according to the invention.
Figure 13:
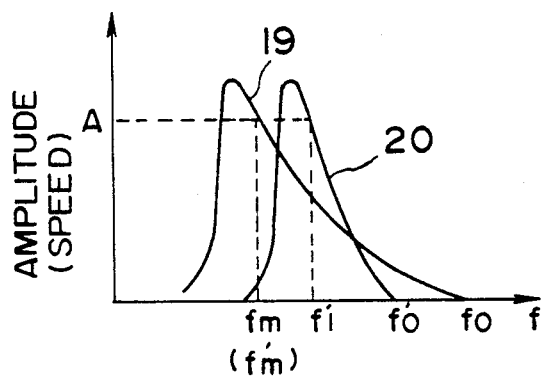
FIG. 13 is an explanatory diagram showing speed characteristics according to the invention.

FIG. 12 shows frequency characteristics of the consumed powers in each of the above two cases. FIG. 13 shows an amplitude (speed) in the case of each of the above consumed powers. To generate the alternating voltage $V_i$, the driving circuit of the vibration driven motor generally allows a DC power source to perform a switching operation by a transistor, an FET, or the like. Therefore, in the case of considering the consumed power in the driving circuit, it is necessary to consider it by an apparent power instead of considering it by only the effective power. The consumed power in FIG. 12 indicates the apparent power and is equal to the product of $|Y|$ and the voltage. When $f_m \leq f_e$, characteristics shown by solid lines 17 and 19 are obtained. When $f_m' \geq f_e$, characteristics shown by solid lines 18 and 20 are derived.

As shown in FIG. 13, amplitude (speed) characteristics of the vibrator have hysteresis characteristics which are gentle in a high frequency region and are sharp in a low frequency region. Therefore, in the case of performing a speed control of the motor by changing a driving frequency, in general, a frequency region higher than $f_m$ ($f_m'$) is used. In the case where a frequency region higher than an amplitude (speed) A near $f_m$ is used and $f_m \leq f_e$, a wide frequency region of $f_O$ to $f_m$ can be used and a gentle speed control can be performed. When $f_m' \geq f_e$, however, a narrow frequency region of $f_O'$ to $f_i'$ must be used. Moreover, at a frequency $f_i'$, there is a relation of $f_i' > f_m'$ and such a state is not a mechanical resonant state. Therefore, efficiency is low and a consumed power B' at that time is larger than the consumed power B in the case of $f_m \leq f_e$. Therefore, in the construction of FIG. 1, the apparatus is constructed so as to set the relation of $f_m \leq f_e$.

Figure 2:
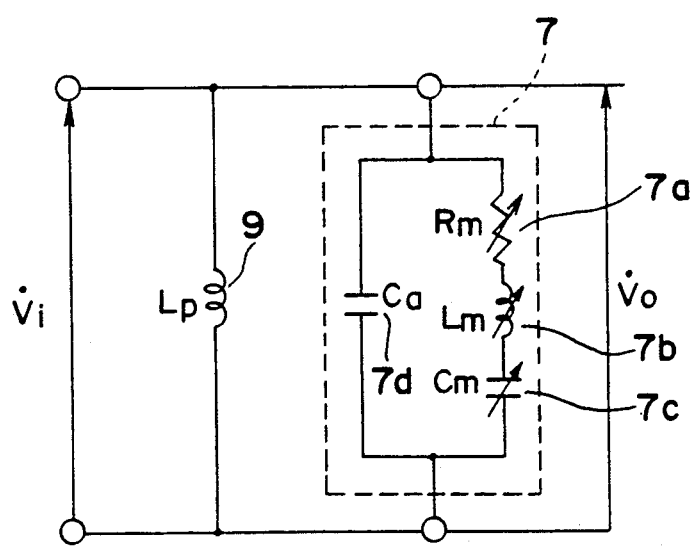
FIG. 2 is an equivalent circuit diagram showing a second embodiment of a vibration driven motor according to the invention.

FIG. 2 shows an equivalent circuit of a second embodiment of the invention. Reference numeral 7 denotes the equivalent circuit of the vibration driven motor and 9 indicates an inductance element having an inductance $L_p$ connected in parallel with the equivalent circuit 7.

Figure 9:
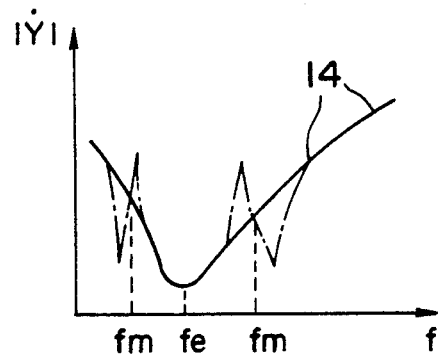
FIG. 9 is a characteristic graph showing characteristics of the second embodiment.

FIG. 9 shows frequency characteristics of the absolute value $|Y|$ of the admittance of the equivalent circuit of FIG. 2. A solid line 14 shows characteristics in the case where the RLC serial circuit of the mechanical vibrating portion of the above equivalent circuit is eliminated from the equivalent circuit of FIG. 2.

In this case, a parallel resonant circuit comprising the inductance $L_p$ and electrostatic capacitance $C_d$ which are connected in parallel is provided. The absolute value has the minimum value at the electrical resonant frequency $$f_e = 1/(2\pi \sqrt{L_p C_d})$$

By adding the equivalent circuit 7 of the mechanical vibrating portion to the above parallel resonant circuit, characteristics as shown by an alternate long and short dash line are obtained. Labels $f_m$ and $f_m'$ indicate the mechanical resonant frequencies in the cases where $f_m \geq f_e$ and where $f_m' \geq f_e$.

In a manner similar to FIG. 8, frequency characteristics of the consumed power and the amplitude (speed) in the above case are as shown in FIGS. 12 and 13.

As shown in the above first and second embodiments, the motor can be effectively driven by setting the mechanical resonant frequency to such a frequency that the admittance Y of the circuit from which the RLC serial circuit section of the mechanical vibrating portion of the vibration driven motor is eliminated satisfies the relation $$\frac{\partial |Y|}{\partial \omega} \geq 0$$

Since it is generally necessary to apply a voltage within a range from tens of volts to hundreds of volts to the vibration driven motor, when the alternating voltage $V_i$ on the input side is set to a low voltage source, it is necessary to step up the voltage $V_O$ across the driving electrodes.

Since a step-up effect is provided in the case of the electrical LC serial resonant circuit as shown in FIG. 1, it is practical to regard that the inductance element 8 (FIG. 1) is a coil having the self-inductance $L_l$.

Figure 4:
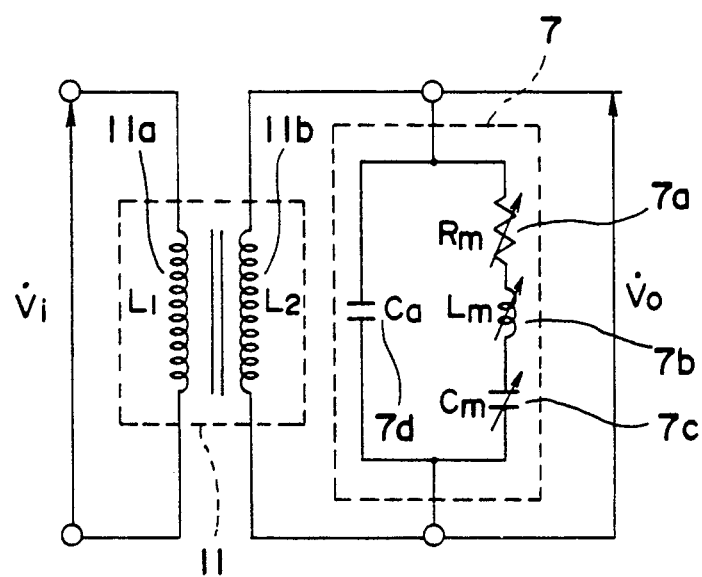
FIG. 4 is an equivalent circuit diagram showing a modification of the second embodiment.
Figure 5:
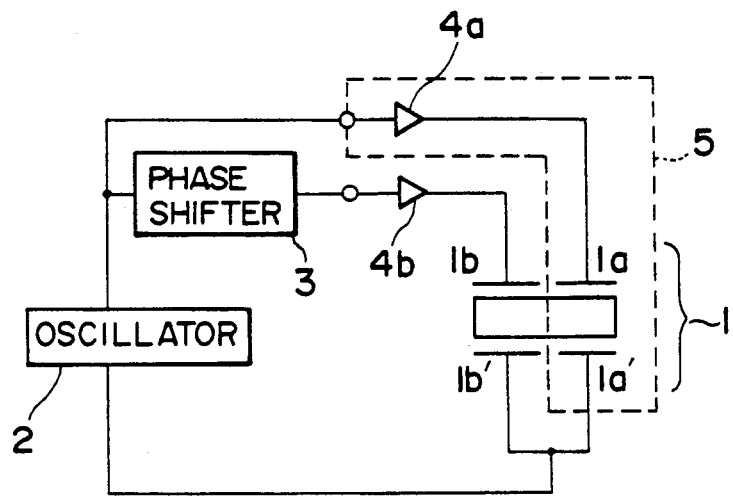
FIG. 5 is a circuit diagram showing a driving circuit of a conventional vibration driven motor.
Figure 6:
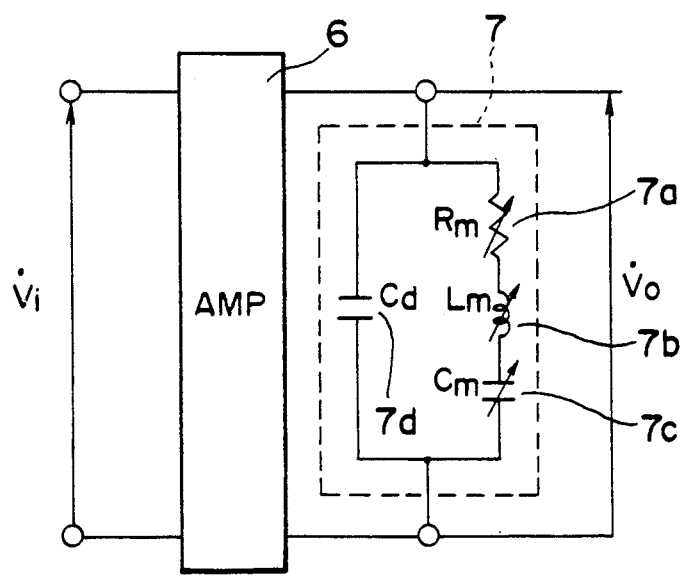
FIG. 6 is an equivalent circuit diagram of a driving phase in FIG. 5.

In the case of the electrical LC parallel resonant circuit as shown in FIG. 2, since there is no step-up effect, it is practical to construct the inductance element 9 as a self-inductance $L_2$ on the secondary side of a transformer (refer to FIG. 4). In FIG. 4, reference numeral 11 denotes a transformer; 11a a coil on the primary side of the self-inductance $L_1$; and 11b a coil on the secondary side of the self-inductance $L_2$. In this instance, the voltage step-up ratio n is $$n = |V_O/V_i| = \sqrt{\frac{L_2}{L_1}}$$

The voltage $V_O$ across the driving electrodes is raised and the motor can be efficiently driven as mentioned above.

Figure 3:
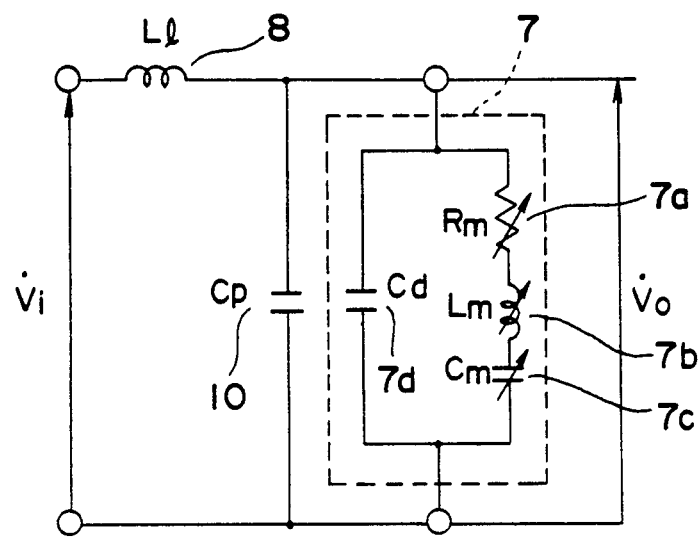
FIG. 3 is an equivalent circuit diagram showing a third embodiment of a vibration driven motor according to the invention.

FIG. 3 is an equivalent circuit showing a third embodiment of the invention. Reference numeral 7 denotes the equivalent circuit of the vibration driven motor; 8 denotes the inductance element having the inductance $L_l$ connected serially to the equivalent circuit 7; and 10 denotes an electrostatic capacitance element having an electrostatic capacitance $C_p$ connected in parallel with the circuit 7. By connecting the electrostatic capacitance element 10 in parallel as mentioned above, the sum $(C_p+C_d)$ of the electrostatic capacitance $C_p$ and self-electrostatic capacitance $C_d$ can be regarded as an electrostatic capacitance of the electrical LC serial resonance circuit, so that an effect similar to that in FIG. 1 is obtained. As shown in FIG. 2, in the case of connecting the element 10 in parallel to the circuit in which the inductance element is connected in parallel, it is also possible to similarly consider. Since the frequency characteristics of the admittance Y and voltage step-up ratio when the LC resonance circuit is used change in accordance with the values of L and C, it is effective to add the proper electrostatic capacitance $C_p$ in parallel as mentioned above when desired characteristics are not obtained because the self-electrostatic capacitance $C_d$ is too small or the like.

Figure 14:
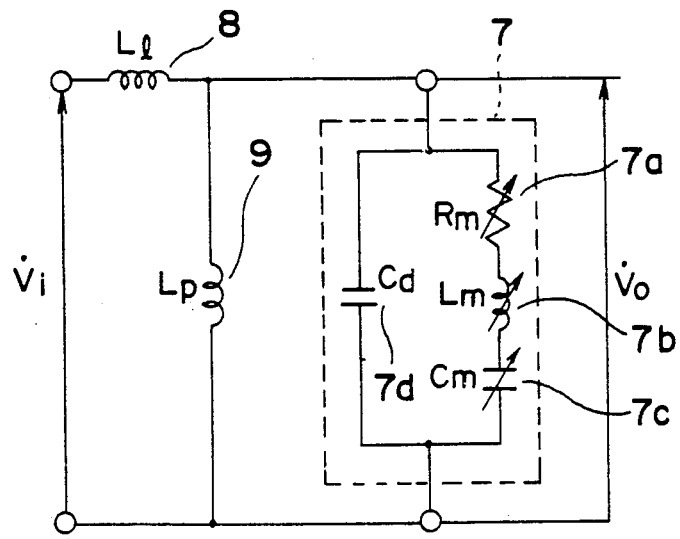
FIG. 14 is an equivalent circuit diagram showing a fourth embodiment of the invention.

FIG. 14 shows an equivalent circuit showing a fourth embodiment of the invention. Reference numeral 7 denotes the equivalent circuit of the vibration driven motor; 8 denotes the inductance element having the inductance $L_l$ connected serially to the circuit 7; and 9 denotes the inductance element having the inductance $L_p$ connected in parallel to the circuit 7.

Figure 10:
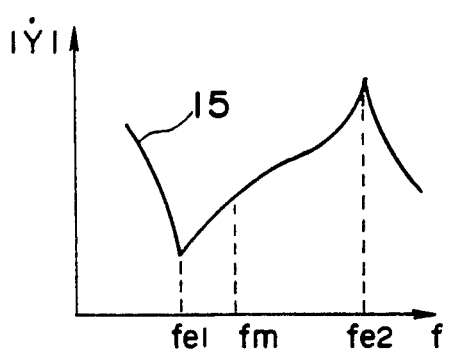
FIG. 10 is a characteristic diagram showing characteristics of an embodiment shown in FIG. 14.
Figure 11:
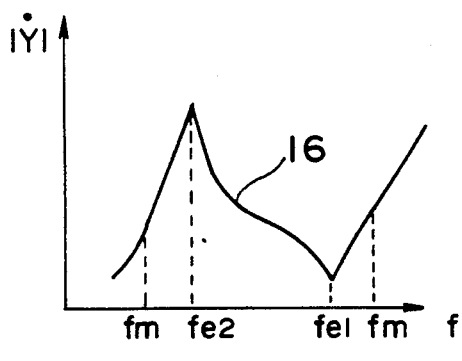
FIG. 11 is a characteristic diagram showing characteristics of the embodiment of FIG. 14 together with FIG. 10.

In this case, the LC serial resonance of FIG. 1 and the LC parallel resonance of FIG. 2 are combined. FIGS. 10 and 11 show frequency characteristics of the absolute value $|Y|$ of the admittance of the equivalent circuit of FIG. 14. Solid lines 15 and 16 indicate frequency characteristics in the case where the RLC serial circuit of the mechanical vibrating portion is eliminated from the equivalent circuit of FIG. 14. In this case, the absolute value $|Y|$ has a minimum value at an electrical LC parallel resonance frequency $f_{el}$ of the inductance $L_p$ and electrostatic capacitance $C_d$ which are connected in parallel $$f_{e1} = 1/(2\pi \sqrt{L_p C_d})$$

The absolute value Y has the maximum value at an electrical LC serial resonant frequency $f_{e2}$ of the inductance $L_l$ and electrostatic capacitance $C_d$ which are serially connected $$f_{e2} = 1/(2\pi \sqrt{L_1 C_d})$$

FIG. 10 shows the characteristics when $f_{el}=f_{e2}$. FIG. 11 shows the characteristics when $f_{el}>f_{e2}$. In a manner similar to that described in the foregoing embodiment, in the case of the embodiment of FIG. 14, the motor can be further efficiently driven by setting the mechanical resonant frequency $f_m$ to the following frequency.

$$\frac{\partial |Y|}{\partial \omega} \geq 0$$

As described above, according to the invention, at least one inductance element is connected serially or in parallel with, or alternatively at least one each serially and in parallel between the driving electrodes of the vibration driven motor and the electrical LC resonance is used and the mechanical resonant frequency for driving is set to a frequency such that the admittance Y of the circuit from which the RLC serial circuit section of the mechanical vibrating portion of the vibration driven motor is eliminated satisfies the relation $$\frac{\partial |Y|}{\partial \omega} \geq 0$$

Due to this, a gentle speed control can be performed by using the wide frequency region and the consumed power can be also reduced.

What is claimed is:

1. A driving circuit for a vibration driven motor or actuator including an electromechanical energy conversion member and having an equivalent circuit including a series connection having an inductor, a resistor, and a capacitor, and a specific electrostatic capacitance connected in parallel with said series connection, said driving circuit comprising:
at least one inductor connected in series or in parallel with, or at lest one each in series and in parallel with, said equivalent circuit, wherein a mechanical resonant frequency of said motor or actuator is set to a frequency such that an admittance Y of the driving circuit from which the series connection of said conversion member is eliminated satisfies the relation $$\frac{\partial |Y|}{\partial \omega} > 0.$$

2. A driving circuit according to claim 1, further comprising a capacitor connected in parallel with said specific electrostatic capacitance.

3. A driving circuit for a vibration driven motor or actuator including an electromechanical energy conversion member and having an equivalent circuit including a series connection having an inductor, a resistor, and a capacitor, and a specific electrostatic capacitance connected in parallel with said series connection, said driving circuit comprising:
   at least one inductor connected in series or in parallel with, or at least one each in series and in parallel with, said equivalent circuit, wherein a mechanical resonant frequency of said motor or actuator is set to a frequency such that an admittance Y of the driving circuit consisting of said at least one inductor and said specific electrostatic capacitance satisfies the relation $$\frac{\partial |Y|}{\partial \omega} > 0.$$

4. A vibration driven motor or actuator comprising:
a vibrating member including an electromechanical energy conversion member and having an equivalent circuit including a series connection having an inductor, a resistor, and a capacitor, and a specific electrostatic capacitance connected in parallel with said series connection, and at least one inductor connected in series or in parallel with, or at least one each in series and in parallel with, said equivalent circuit;
wherein a mechanical resonant frequency of said motor or actuator is set to a frequency such that an admittance Y of the motor or actuator from which the series connection of said conversion member is eliminated satisfies the relation $$\frac{\partial |Y|}{\partial \omega} > 0.$$

5. An ultrasonic transducer device, comprising:
an electromechanical energy conversion member having an equivalent circuit including a series connection having an inductor, a resistor, and a capacitor, and a specific electrostatic capacitance connected in parallel with said series connection; and
at least one inductor connected in series or in parallel with, or at least one each in series and in parallel with, said equivalent circuit, wherein a mechanical resonant frequency of said device is set to a frequency such that an admittance Y of the device from which the series connection of said conversion member is eliminated satisfies the relation $$\frac{\partial |Y|}{\partial \omega} > 0.$$

6. An ultrasonic transducer device according to claim 5, further comprising a capacitor connected in parallel with said specific electrostatic capacitor.

7. A driving circuit for a vibration driven motor or actuator including an electromechnical energy conversion member and having an equivalent circuit including a series connection having an inductor, a resistor, and a capacitor, and a specific electrostatic capacitance in parallel with said series connection, said driving circuit comprising:
   at least one inductor connected in series with said equivalent circuit, wherein a mechanical resonant frequency of said motor or actuator is set to a frequency such that an admittance Y of the driving circuit from which the series connection of said conversion member is eliminated satisfies the relation $$\frac{\partial |Y|}{\partial \omega} > 0.$$

* * * * *

UNITED STATES PATENT AND TRADEMARK OFFICE
CERTIFICATE OF CORRECTION

PATENT NO. 5,311,093  Page 1 of 2

DATED  May 10, 1994

INVENTOR(S) MUKOHJIMA

It is certified that error appears in the above-indentified patent and that said Letters Patent is hereby corrected as shown below: Title page, items,

At [56] Foreign Patent Documents

Change "1315273 12/1989 Japan
       2179282 7/1990 Japan" to
  --1-315273 12/1989 Japan
    2-179282 7/1990 Japan--

At [56] Foreign Patent Documents

Change  "0426042 5/1991 Japan" to
Change  --0426042 5/1991 Europe--.

At [57] Abstract

Line 3, change "selfelectrostatic" to --self-electrostatic--.

UNITED STATES PATENT AND TRADEMARK OFFICE
CERTIFICATE OF CORRECTION

PATENT NO. : 5,311,093
DATED : May 10, 1994
INVENTOR(S) : MUKOHJIMA

It is certified that error appears in the above-indentified patent and that said Letters Patent is hereby corrected as shown below:

Column 1

Line 16, change "type" to --type of--.

Column 3

Line 9, change "Li" to --$L_\ell$--.
    Line 31, change "$(w \leq 2\pi f)$" to --$(w \leq 2\pi f)$.--.

Signed and Sealed this

Eleventh Day of October, 1994

Attest:

BRUCE LEHMAN

Attesting Officer

Commissioner of Patents and Trademarks